(12) United States Patent
Fry et al.

(10) Patent No.: US 9,501,221 B2
(45) Date of Patent: Nov. 22, 2016

(54) DYNAMICALLY CHANGING A BUFFER FLUSH THRESHOLD OF A TAPE DRIVE BASED ON HISTORICAL TRANSACTION SIZE

(71) Applicant: International Business Machines Corporation, Armonk, NY (US)

(72) Inventors: Scott M. Fry, Oro Valley, AZ (US); James M. Karp, Tucson, AZ (US); Takashi Katagiri, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 14/010,431

(22) Filed: Aug. 26, 2013

(65) Prior Publication Data

US 2015/0058504 A1 Feb. 26, 2015

(51) Int. Cl.
*G06F 5/06* (2006.01)
*G06F 3/06* (2006.01)

(52) U.S. Cl.
CPC ........................................ *G06F 3/06* (2013.01)

(58) Field of Classification Search
None
See application file for complete search history.

(56) References Cited

U.S. PATENT DOCUMENTS

| 5,210,829 A * | 5/1993 | Bitner ................... G06F 3/0601 710/57 |
|---|---|---|
| 7,218,468 B2 | 5/2007 | Jauette et al. |
| 7,710,681 B2 | 5/2010 | Itagaki et al. |
| 8,234,443 B2 | 7/2012 | Katagiri |
| 2011/0116185 A1 | 5/2011 | Katagiri et al. |
| 2012/0229931 A1 | 9/2012 | Katagiri et al. |
| 2012/0293887 A1 | 11/2012 | Abe et al. |
| 2013/0155540 A1 | 6/2013 | Katagiri |

\* cited by examiner

*Primary Examiner* — Idriss N Alrobaye
*Assistant Examiner* — Dayton Lewis-Taylor
(74) *Attorney, Agent, or Firm* — Zilka-Kotab, PC

(57) ABSTRACT

According to one embodiment, a method for dynamically changing a buffer threshold in a tape drive includes determining that a drive buffer is emptied of data, calculating a write size indicating an amount of data from a transaction size left to be written to a tape prior to a next anticipated sync command, setting a buffer threshold that triggers a back hitch to a smaller value when the transaction size is less than a buffer size, setting the buffer threshold to the smaller value when an absolute difference between the transaction size and the write size is greater than or equal to the buffer size, and setting the buffer threshold to a larger value when the transaction size is not less than the buffer size and/or the absolute difference between the transaction size and the write size is less than the buffer size.

20 Claims, 4 Drawing Sheets

DYNAMICALLY CHANGING A BUFFER FLUSH THRESHOLD OF A TAPE DRIVE BASED ON HISTORICAL TRANSACTION SIZE

BACKGROUND

The present invention relates to storage systems, and more particularly, this invention relates to a tape drive configured to dynamically change a buffer flush threshold based on historical transaction size.

A conventional tape drive includes a data buffer which acts as a cache to remove any performance impact caused by tape motion (back hitching of the tape to move the tape to a position to write data) which makes writing to tape appear to be slower than desired. For example, when a host application sends data to a tape drive, the tape drive stores the data in the data buffer. If an adequate amount of data is stored in the buffer, the drive will begin to write the data to the tape. When the buffer becomes empty after writing the data to the tape, the tape drive back hitches to the position where writing ceased (e.g., tape motion to rewind the tape and reposition to the last written data and restart the write operation from the end of the last written data when additional data to write is received). The back hitch is used in order to write data to the tape without capacity loss which would occur if the tape were not back hitched. If the back hitch is not invoked at buffer empty, a gap between written data will remain on the tape where there is no data written. During the back hitch, the tape drive continues to receive the data from the host application until the buffer becomes filled.

In this way, the data buffer is able to hide the performance impact caused by back hitching the tape. If the host transfer rate is slower than the minimum transfer rate for the tape drive to read/write the data, it is preferred to store the data in the data buffer for as long as possible. Then the tape drive may start the write/read operation, in order to avoid an extra back hitch which may cause damage to the tape.

For example, if the drive starts to write data on the tape until the buffer is partially emptied of data, there is less data to be written to the tape. Therefore, a back hitch after writing the data occurs sooner than if more data had been stored in the buffer prior to starting the writing operation. If the tape drive starts to write data after an adequate amount of data is resident in the buffer, there is more data to be written to the tape and the number of back hitches over the course of operation of the tape drive is reduced.

However, storing more and more data to the buffer is not practicable in some cases, such as when a synchronization (sync) command is issued. The sync command is issued by the host application, and when the tape drive receives the sync command, the tape drive is forced to write all unwritten data from the drive buffer to the tape. If there is a large amount of data in the buffer, the elapsed time needed to write all of the data to the tape will be longer than desired.

Therefore, while the tape drive attempts to store as much data in the drive buffer as possible to reduce the number of back hitches for slow streaming writing, the receipt of a sync command then causes the performance of the tape drive to be degraded.

BRIEF SUMMARY

In one embodiment, a tape drive includes a drive buffer, a processor, and logic integrated with and/or executable by the processor, the logic being configured to cause the processor to collect tape drive writing information while receiving data from a host, the tape drive writing information including a transaction size (S) indicating an amount of data received by the tape drive and stored in the drive buffer between receiving synchronization (sync) commands and a host transfer rate (H) indicating a speed at which data is received by the tape drive, determine that the drive buffer is emptied of data, calculate a write size (s) indicating an amount of data from the transaction size (S) left to be written to a tape prior to a next anticipated sync command, set a buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape, set the buffer threshold (b) to the smaller value when an absolute difference between the transaction size (S) and the write size (s) is greater than or equal to the buffer size (B), and set the buffer threshold (b) to a larger value when the transaction size (S) is not less than the buffer size (B) and/or the absolute difference between the transaction size (S) and the write size (s) is less than the buffer size (B).

In another embodiment, a computer program product for dynamically changing a buffer threshold in a tape drive includes a computer readable storage medium having program code embodied therewith, the program code readable/executable by a processor to collect tape drive writing information while receiving data from a host, the tape drive writing information including a transaction size (S) indicating an amount of data received by the tape drive and stored in a drive buffer between receiving synchronization (sync) commands and a host transfer rate (H) indicating a speed at which data is received by the tape drive, determine that the drive buffer is emptied of data, calculate a write size (s) indicating an amount of data from the transaction size (S) left to be written to a tape by the tape drive prior to a next anticipated sync command, set the buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape, set the buffer threshold (b) to the smaller value when an absolute difference between the transaction size (S) and the write size (s) is greater than or equal to the buffer size (B), and set the buffer threshold (b) to a larger value when the transaction size (S) is not less than the buffer size (B) and/or the absolute difference between the transaction size (S) and the write size (s) is less than the buffer size (B).

According to another embodiment, a method for dynamically changing a buffer threshold in a tape drive includes collecting tape drive writing information while receiving data from a host, the tape drive writing information including a transaction size (S) indicating an amount of data received by the tape drive and stored in a drive buffer between receiving synchronization (sync) commands and a host transfer rate (H) indicating a speed at which data is received by the tape drive, determining that the drive buffer is emptied of data, calculating a write size (s) indicating an amount of data from the transaction size (S) left to be written to a tape prior to a next anticipated sync command, setting a buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape, setting the buffer threshold (b) to the smaller value when an absolute difference between the transaction size (S) and the write size (s) is greater than or equal to the buffer size (B), and setting the buffer threshold (b) to a larger value when the transaction size (S) is not less than the buffer size (B) and/or the absolute difference between the transaction size (S) and the write size (s) is less than the buffer size (B).

Other aspects and embodiments of the present invention will become apparent from the following detailed description, which, when taken in conjunction with the drawings, illustrate by way of example the principles of the invention.

DETAILED DESCRIPTION

Figure 1A:
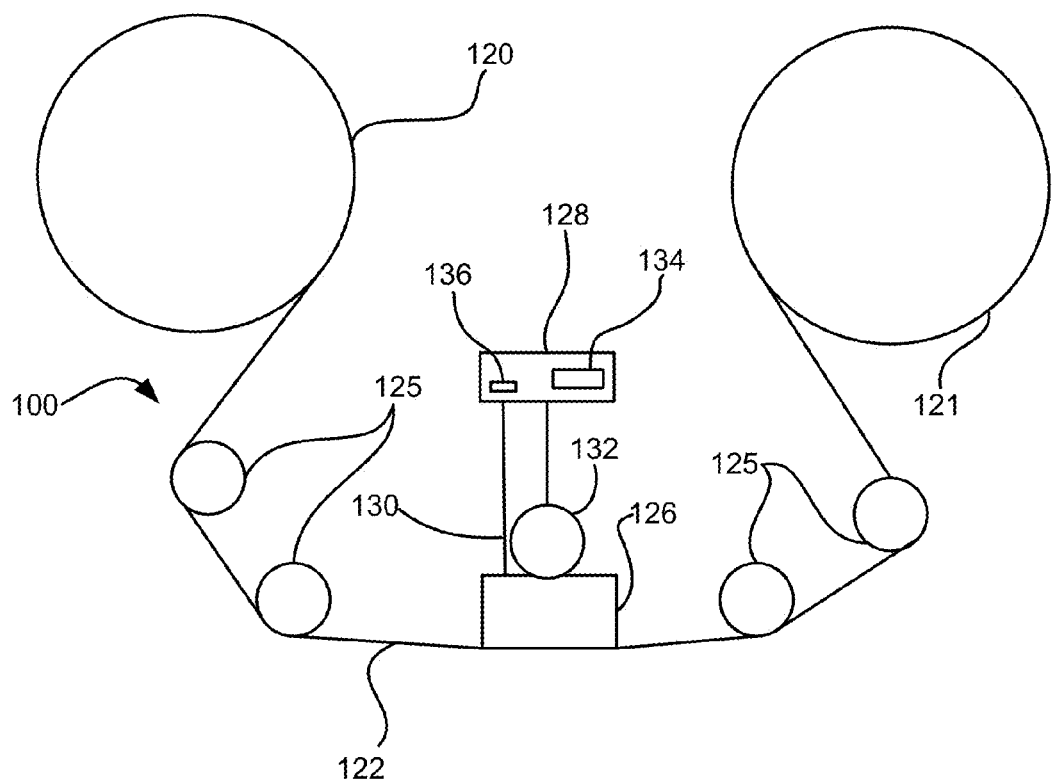
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of tape drives and data buffer operational schemes that improve tape drive performance and reduce lag upon receiving a synchronization (sync) command.

In one general embodiment, a tape drive includes a drive buffer, a processor, and logic integrated with and/or executable by the processor, the logic being configured to cause the processor to collect tape drive writing information while receiving data from a host, the tape drive writing information including a transaction size (S) indicating an amount of data received by the tape drive and stored in the drive buffer between receiving synchronization (sync) commands and a host transfer rate (H) indicating a speed at which data is received by the tape drive, determine that the drive buffer is emptied of data, calculate a write size (s) indicating an amount of data from the transaction size (S) left to be written to a tape prior to a next anticipated sync command, set a buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape, set the buffer threshold (b) to the smaller value when an absolute difference between the transaction size (S) and the write size (s) is greater than or equal to the buffer size (B), and set the buffer threshold (b) to a larger value when the transaction size (S) is not less than the buffer size (B) and/or the absolute difference between the transaction size (S) and the write size (s) is less than the buffer size (B).

In another general embodiment, a computer program product for dynamically changing a buffer threshold in a tape drive includes a computer readable storage medium having program code embodied therewith, the program code readable/executable by a processor to collect tape drive writing information while receiving data from a host, the tape drive writing information including a transaction size (S) indicating an amount of data received by the tape drive and stored in a drive buffer between receiving synchronization (sync) commands and a host transfer rate (H) indicating a speed at which data is received by the tape drive, determine that the drive buffer is emptied of data, calculate a write size (s) indicating an amount of data from the transaction size (S) left to be written to a tape by the tape drive prior to a next anticipated sync command, set the buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape, set the buffer threshold (b) to the smaller value when an absolute difference between the transaction size (S) and the write size (s) is greater than or equal to the buffer size (B), and set the buffer threshold (b) to a larger value when the transaction size (S) is not less than the buffer size (B) and/or the absolute difference between the transaction size (S) and the write size (s) is less than the buffer size (B).

According to another general embodiment, a method for dynamically changing a buffer threshold in a tape drive includes collecting tape drive writing information while receiving data from a host, the tape drive writing information including a transaction size (S) indicating an amount of data received by the tape drive and stored in a drive buffer between receiving synchronization (sync) commands and a host transfer rate (H) indicating a speed at which data is received by the tape drive, determining that the drive buffer is emptied of data, calculating a write size (s) indicating an amount of data from the transaction size (S) left to be written to a tape prior to a next anticipated sync command, setting a buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape, setting the buffer threshold (b) to the smaller value when an absolute difference between the transaction size (S) and the write size (s) is greater than or equal to the buffer size (B), and setting the buffer threshold (b) to a larger value when the transaction size (S) is not less than the buffer size (B) and/or the absolute difference between the transaction size (S) and the write size (s) is less than the buffer size (B).

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
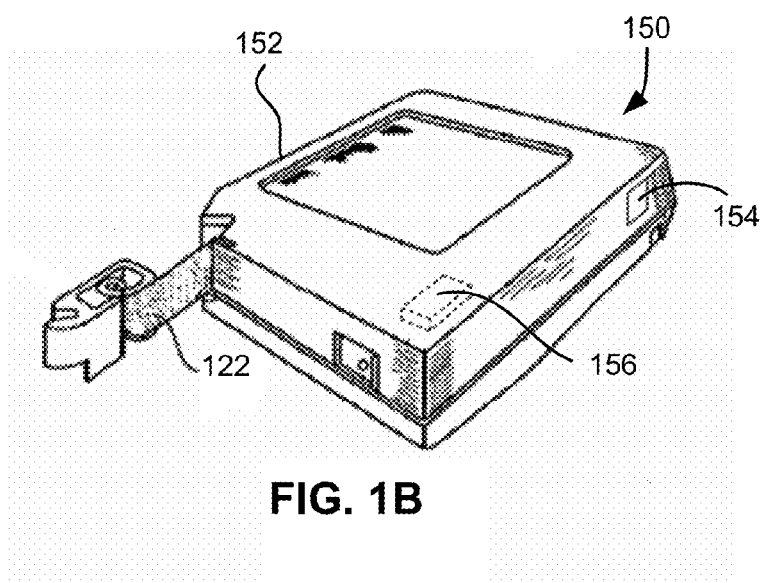
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
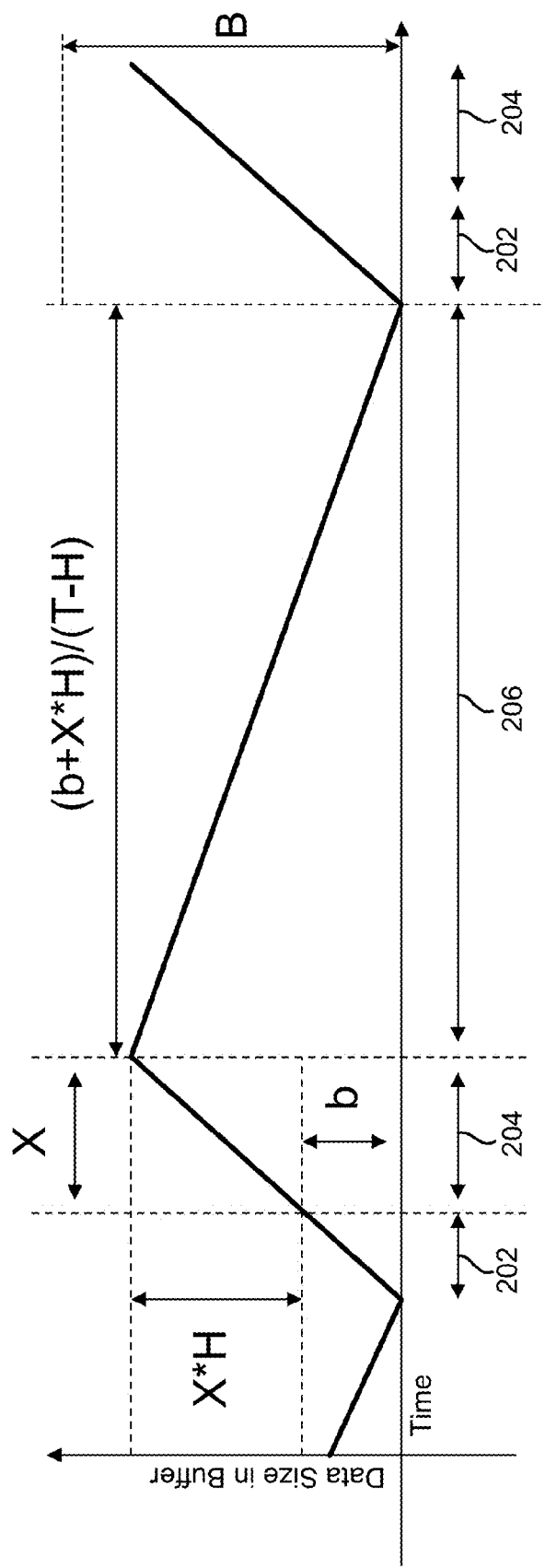
FIG. 2 depicts operation of a conventional tape drive, according to the prior art.

An example is provided with reference to FIG. 2 which describes operation of a conventional tape drive. Time period 202 is an amount of time that passes while data is filled in the drive buffer after the buffer is emptied and prior to the buffer threshold (b) being reached. Time period 204 is an amount of time that passes during a back hitch of the tape. Time period 206 is an amount of time which passes while writing data in the drive buffer to the tape.

In this example, B is the Drive Buffer_Size in MB (e.g., 1000 MB), H is the Host Transfer Rate in MB/sec (e.g., 10 MB/sec), T is the Tape Transfer Rate in MB/sec (e.g., 20 MB/sec), b is a buffer threshold which is the amount of data stored in the buffer when the tape drive starts the back hitch in MB (e.g., 400 MB), and X is the time that elapses for the back hitch to complete (e.g., 5 sec.). When the tape drive completes the back hitch (which started when the tape buffer was at b), the data in the drive buffer is represented by b+X*H. Then, the tape drive starts to write according to the Tape Transfer Rate (T). That is, the drive buffer will be empty again after (b+X*H)/(T−H) seconds.

For example, if b=500, b+X*H=550 sec., and if b=300, b+X*H=350 sec. The buffer will be empty another 55 sec. later for b=500, and it will be empty again after another 35 sec. for b=300.

In general, the tape drive starts the back hitch to reposition the tape for a write operation when b meets the following thresholds to store as much data in the tape buffer as possible without the performance degradation caused by the back hitch: X≤(B−b)/H.

In other words, if the tape drive starts the back hitch before the buffer is full, then during this back hitch the drive is able to continue to receive the data from the host application without performance penalty. In the above example, a preferred b may be about 950 for this reason.

On the other hand, the host application may sometimes issue a sync command. When the tape drive receives the sync command, the tape drive is force to write all unwritten data from the drive buffer to the tape. If the tape drive keeps as much data as is possible in the drive buffer to reduce the back hitch as much as possible for streaming slow writing, when the sync command is received, the performance for the sync command will be seriously impacted negatively (degraded). Therefore, the two following factors may be balanced if the host transfer rate is slow in order to improve performance: 1) damage to the tape should be mitigated by limiting the number of back hitches, and therefore as much unwritten data should be kept on the tape drive as possible; and 2) a sync command should be completed as soon as possible, and therefore a minimum amount of unwritten data should be stored on the tape drive when the sync command is received.

In order to properly balance the above two factors, in one embodiment, the drive buffer threshold b may be dynamically changed between based on how data has historically been provided to the tape drive and how often sync commands have historically been received by the tape drive. In one embodiment, a "streaming slow write case" and a "sync command case." may be defined for the different historical situations. A tape drive which is historically experiencing a "streaming slow write case" should have a larger buffer threshold (b), while a tape drive historically experiencing a "sync command case" should have a smaller buffer threshold (b).

In one approach, when to make the buffer threshold switch may be determined by monitoring the history of data size transactions between sync commands, which is referred to as the "transaction size" herein.

To meet the above described factors, the tape drive may monitor the history of the transaction size between sync commands and change the buffer threshold which controls the timing to start the tape motion for back hitch in order to most effectively balance the two factors. The history of the size of data transactions that occur between sync commands may be monitored using any mechanism known in the art. If the tape drive expects that the host application may issue a sync command soon (a sync command is imminent based on historical data about transaction size), then the tape drive may start to write unwritten data from the drive buffer onto the tape in order to clear out the drive buffer as much as possible prior to receiving a sync command. Conversely, if the history of transaction size indicates that the host application may not issue a sync command for a long period of time, the tape drive may keep the unwritten data in the drive buffer as long as possible to minimize back hitches.

This methodology is capable of reducing the number of back hitches that occur during slow streaming writing, while also minimizing the latency associated with receiving a sync command when the drive buffer is full of unwritten data.

Figure 3:
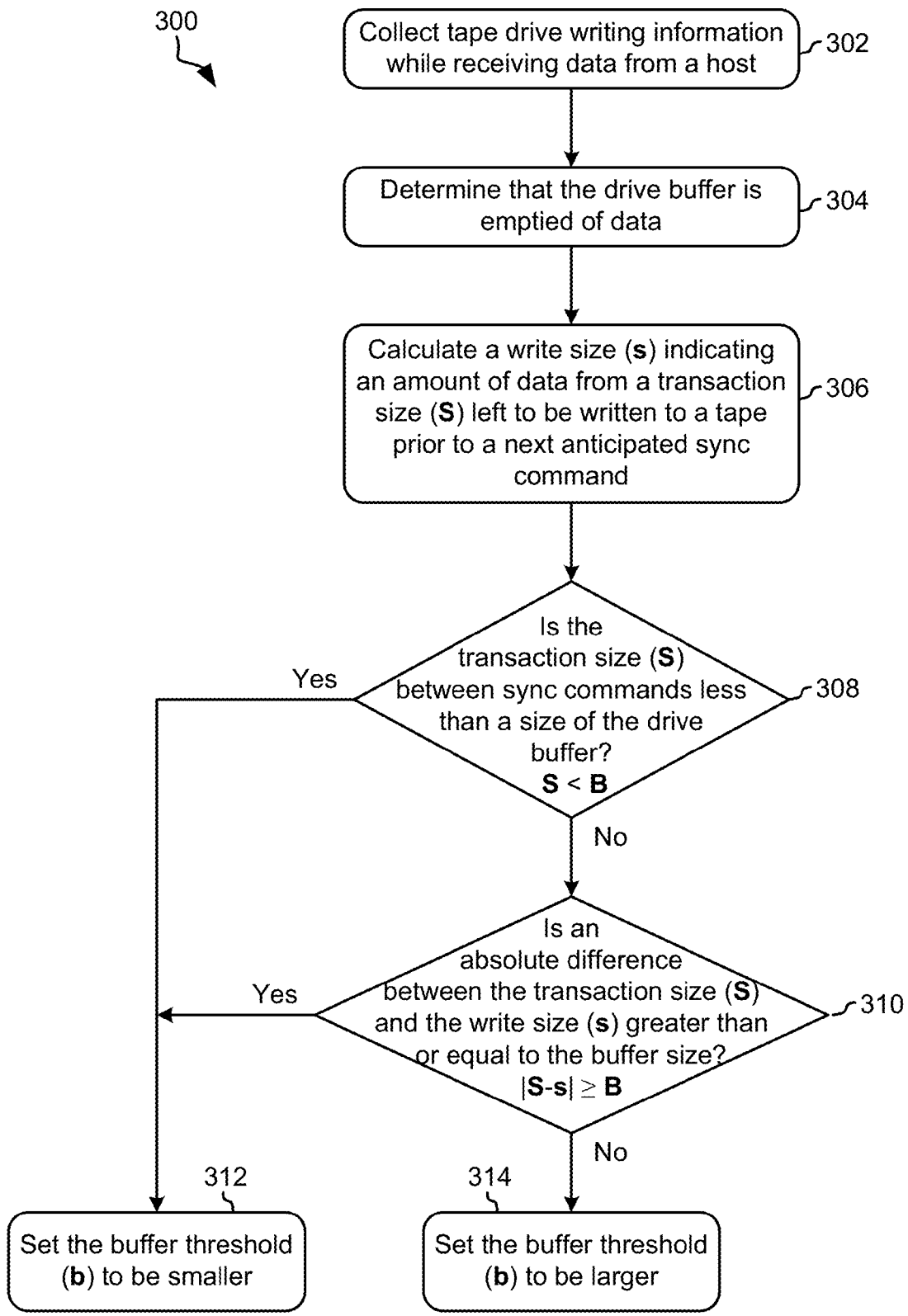
FIG. 3 shows a flowchart of a method according to one embodiment.

Now referring to FIG. 3, a flowchart of a method 300 for providing early warning of storage device failure is shown, according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in one embodiment, the method 300 may be partially or entirely performed by a storage controller, a management controller, a statistical analysis module, a RAS module, a processor (such as an ASIC, a FPGA, a CPU, etc.) embodied in a computer or device, a host or server connected to a the internal or external network, etc.

As shown in FIG. 3, method 300 is described in reference to several parameters. Some of these parameters have the same definition as in the previous example, such as B which is the Drive Buffer_Size in MB, H which is the Host Transfer Rate in MB/sec, T which is the Tape Transfer Rate in MB/sec, b which is the amount of data in MB stored in the buffer when the tape drive starts the back hitch, and X which is the time that elapses for the back hitch to complete. Additional parameters used in the description of method 300 include S which is a transaction size in MB, and s which is a calculated value which indicates an amount of data to be written after the last received sync command (e.g., it is the determined data size to write between sync commands).

The tape drive monitors the data size between sync commands (which is referred to as the transaction size=S), and uses this historical transaction size to calculate when the host application will issue the next sync command. For example, an average of all historical transaction sizes may be used as the calculated value indicating an amount of data to be written after the last received sync command, s. In another embodiment, an average of the historical transaction sizes over a number of previous transfer windows (time between sync commands) may be used to calculate s.

In parallel, the tape drive may ensure that the data queued to be written from the last sync command has completed being written, which is the last calculated s. If the data has not completed writing, then the s calculated in the last transaction window was too great, and therefore the new s may be determined to be smaller than an average of the number of monitored transaction sizes. In addition, the tape drive may calculate an average of the monitored host transfer rates over a number of previous transfer windows (time between sync commands) to determine H.

In all of these calculations, parameters B, T, and X, are parameters associated with the functioning of the tape drive, and therefore may be determined when the tape drive is manufactured, put into use, started, etc., and for the sake of these calculations may be considered to be constants. However, if the tape drive functions differently over time, these parameters may be re-verified and updated to reflect any changes over time or due to outside factors.

As shown in FIG. 3, method 300 may initiate with operation 302, where tape drive writing information is collected while receiving data from a host.

The tape drive writing information may include any information relating to writing one set of data to the tape, such as information about data in the drive buffer, data written to the tape, writing rates, transfer rates, etc. In one embodiment, the tape drive writing information includes, but is not limited to: the tape drive buffer size, the host transfer rate, the tape transfer rate, the buffer threshold used for the writing, and the time that elapses for a back hitch to complete prior to writing.

Each of these parameters may be determined each time the buffer is emptied, each time data is written to the tape, etc., and the parameters may be averaged for a number of data writes to the tape. In one embodiment, the parameters are averaged over at least three data writes to the tape, over the course of at least three sync commands, five sync commands, the buffer being emptied three times, etc. Of course, more or less data writes may be observed with tape drive writing information being recorded for each data write to tape in a memory of the tape drive, such as a DRAM or some other cache.

In operation 304, it is determined that the drive buffer is emptied of data. Prior to the drive buffer becoming empty, data is still capable of being written to the tape and data may be received into the drive buffer. The drive buffer may be emptied of data, however, due to all the data stored in the drive buffer being written to the tape, or due to unwritten data in the drive buffer being removed due to some other reason.

In operation 306, a write size (b) is calculated, the write size (s) indicating an amount of data from the transaction size (S) left to be written to a tape prior to a next anticipated sync command. Since the transaction size (S) indicates includes historical information related to how often sync commands are received by the tape drive, a next anticipated sync command may be determined based on how much data from the transaction size (S) has been received by the tape drive and how much data is left to be received prior to the end of the transaction size (S) which would be indicative of an anticipated sync command.

In operation 308, it is determined whether the transaction size (S) is less than a size of the drive buffer (B), e.g., S<B. When the transaction size is less than the drive buffer size, method 300 continues to operation 312; otherwise, method 300 continues to operation 310.

In operation 310, it is determined whether the absolute value of the difference between the transaction size (S) and the write size (s) is greater than or equal to the drive buffer size (B), e.g., |S−s|≥B. When the absolute value of the difference between the transaction size (S) and the write size (s) is greater than or equal to the drive buffer size (B), method 300 continues to operation 312; otherwise, method 300 continues to operation 314.

In operation 312, the buffer threshold (b) is set to be smaller. The smaller threshold may be determined using any technique known in the art and/or as described herein according to various embodiments, such as by multiplying an average of the last three historical transactions sizes by a multiplier of less than one, e.g., 0.9, 0.8, 0.75, 0.5, 0.25, etc. Of course, any of the multipliers or number of historical transaction sizes used in the calculation of the smaller threshold may be changed or modified, such as by using the last five, six, ten, or all of the historical transaction sizes, by subtracting a constant instead of multiplying by the value less than one, etc.

In one embodiment, the smaller value may be equal to the buffer size (B) multiplied by a multiplier of less than one, such as ½, ¼, ⅛, etc., such as B/4.

In a further embodiment, the buffer threshold (b) may only be set to the smaller value after a sufficient number of sync commands have been received by the tape drive, with the sufficient number of sync commands being at least three or more, such as five, seven, nine, etc.

In operation 314, the buffer threshold (b) is set to be larger. The larger threshold may be determined using any technique known in the art and/or as described herein according to various embodiments, such as by multiplying an average of the last three historical transactions sizes by a multiplier of greater than one, e.g., 1.1, 1.2, 1.25, 1.5, 2, 4, etc. Of course, any of the multipliers or number of historical transaction sizes used in the calculation of the larger threshold may be changed or modified, such as by using the last five, six, ten, or all of the historical transaction sizes, by adding a constant instead of multiplying by the value greater than one, etc.

In one embodiment, the larger value may be equal to a difference between the buffer size (B) and an amount of data sent to the tape drive during a back hitch. In this embodiment, the amount of data sent to the tape drive during the back hitch may be calculated as X*H, where X is an elapsed time for the tape drive to perform a back hitch and H is the host data transfer rate such that the larger value equals B−X*H.

In one embodiment, method 300 may further comprise disregarding header label files and/or trailer label files when determining the transaction size (S) between receiving sync commands. This is useful because transaction sizes may be variable when small transactions occur due to header and/or trailer sync commands are taken into account.

In another embodiment, the tape drive writing information may further comprise a tape transfer rate (T) indicating a speed at which data is written to tape by the tape drive, an elapsed time for the tape drive to perform a back hitch (X), and/or the buffer size (B).

According to another embodiment, the method 300 may include receiving additional data from the host and storing the additional data in the drive buffer using the buffer threshold (b) in order to continue writing data to the tape with the more optimized buffer threshold (b) being used.

Method 300 may be performed by a system, apparatus, computer program product, or in any other way known in the art. In one such embodiment, a system (such as a tape drive, tape drive controller, storage system, storage subsystem, computer, management controller, storage controller, etc.) may include a processor (such as a microprocessor, CPU, ASIC, FPGA, etc.) and modules, code, and/or logic (soft or hard) integrated with and/or executable by the processor to execute the steps of the method 300 or portions thereof. In another embodiment, a computer program product may include a computer readable storage medium having program code embodied therewith, the program code readable/executable by a processor to execute the method 300 or portions thereof.

In another embodiment, frequent drive buffer flushes to tape may be utilized by the tape drive. However, the file sizes may alternate between very small and somewhat larger. This variation in file size is due to header and trailer label files being placed between each data file. The header and trailer label files include three 80-byte blocks and a filemark. The data files for some of these systems or applications are not very large (may be less than about 100 MB), but some other systems or applications which use header/trailer files may use larger data files, thereby resulting in uneven file sizes.

That is, the following command sequence is repeated: 1) 80 bytes block write and write filemark (sync) for the header; 2) data file written with sync command; 3) 80 bytes block write and write filemark (sync) for the trailer. If the average of the observed transaction size does not include the trailer and header label writing, an estimate for the transaction size may be produced which provides better performance for the buffer threshold, since the buffer size does not change for the constant sizes of the header and trailer, only for the data file writing.

According to some experimentation, a performance comparison has been made between a conventional method of setting the transaction size and the embodiments described herein. The actual performance difference was measured for writing some data and issuing sync commands on an IBM TS1140 tape drive. The experimentation was performed using a conventional method and method 300 for four different transaction sizes (400 MB, 600 MB, 800 MB, and 1000 MB). The host data rate was set at about 40 MB/sec., which is a relatively slow host data transfer rate. Also, the smaller buffer threshold for the sync case was set as ¼ of the larger buffer threshold for the streaming write case.

Figure 4:
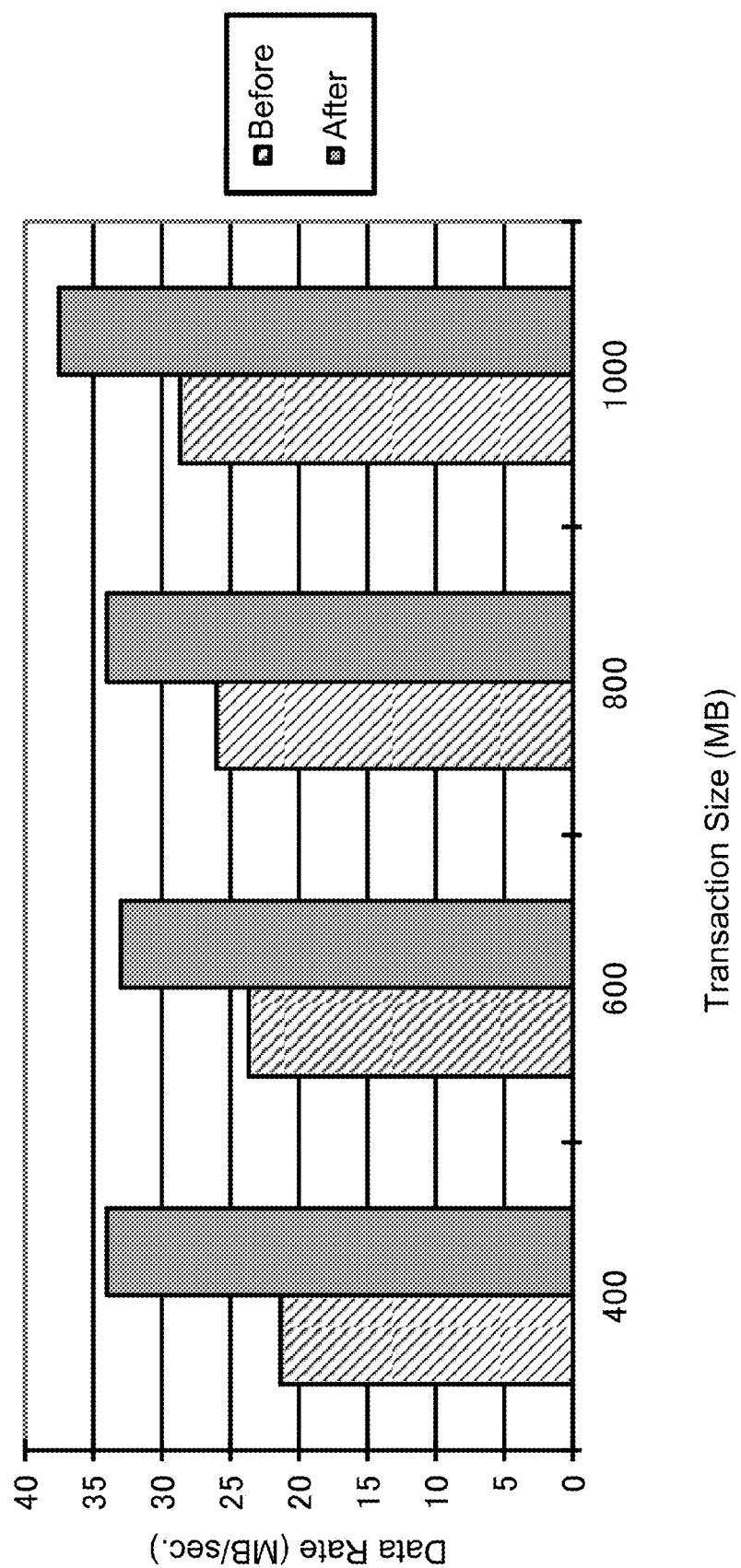
FIG. 4 shows a performance comparison of using historical transaction sizes in determining a buffer threshold, according to one embodiment.

FIG. 4 shows a performance comparison of using historical transaction sizes in determining a buffer threshold, according to one embodiment. In FIG. 4, the X-axis is the transaction size (S) (the amount of data written to tape between sync commands) and the Y-axis is the tape transfer rate (T) in which the data was able to be written to the tape. As can be seen, the tape transfer rate is improved for every transaction size tested for the "After" cases.

The "Before" cases are calculated as the average of the transaction size performance before a sufficient history of transaction size is ready to be used in method 300 of FIG. 3, such as three transactions. The "After" cases are calculated as the average of the transaction size performance after the historical transaction sizes are ready to be used in method 300. That is to say, after the historical transaction sizes are ready, microcode may be used to estimate the next transaction size that would be best suited to the historical transaction sizes available for analysis. After the next transaction size is determined, the buffer threshold is adapted accordingly and sync command performance is improved.

On the other hand, the number of back hitches during slow streaming writing is not different or affected by method 300. If the host data rate is about 40 MB/sec., the back hitch happens once every 1.2 GB as written by the TS1140. Therefore, the number of back hitches observed for each case, the "Before" and the "After" case is unchanged.

These results further support the contention that using method 300 results in better tape transfer performance regardless of data streaming conditions and less back hitches when slow data streaming is observed with minimal sync commands.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape drive, comprising a drive buffer, a processor, and logic integrated with and/or executable by the processor, the logic being configured to cause the processor to:
   collect tape drive writing information while receiving data from a host, the tape drive writing information comprising:

a transaction size (S) indicating an amount of data received by the tape drive and stored in the drive buffer between receiving synchronization (sync) commands; and a host transfer rate (H) indicating a speed at which data is received by the tape drive;

determine that the drive buffer is emptied of data;

calculate a write size (s) indicating an amount of data from the transaction size (S) left to be written to a tape prior to a next anticipated sync command;

set a buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape;

set the buffer threshold (b) to the smaller value when an absolute difference between the transaction size (S) and the write size (s) is greater than or equal to the buffer size (B); and set the buffer threshold (b) to a larger value when the transaction size (S) is not less than the buffer size (B) and/or the absolute difference between the transaction size (S) and the write size (s) is less than the buffer size (B).

2. The tape drive as recited in claim 1, wherein the smaller value is equal to the buffer size (B) multiplied by a multiplier of less than one.

3. The tape drive as recited in claim 2, wherein the smaller value is equal to one fourth of the buffer size (B/4).

4. The tape drive as recited in claim 1, wherein the larger value is equal to a difference between the buffer size (B) and an amount of data sent to the tape drive during a back hitch.

5. The tape drive as recited in claim 4, wherein the amount of data sent to the tape drive during the back hitch is calculated as X*H, where X is an elapsed time for the tape drive to perform a back hitch and H is the host data transfer rate such that the larger value equals B−X*H.

6. The tape drive as recited in claim 1, wherein the logic is further configured to cause the processor to disregard header label files and/or trailer label files when determining the transaction size (S) between receiving sync commands, and wherein the tape drive writing information further comprises:

a tape transfer rate (T) indicating a speed at which data is written to tape by the tape drive;

an elapsed time for the tape drive to perform a back hitch (X); and the buffer size (B).

7. The tape drive as recited in claim 1, wherein the logic is further configured to cause the processor to receive additional data from the host and store the additional data in the drive buffer using the buffer threshold (b).

8. The tape drive as recited in claim 1, wherein the buffer threshold (b) is only set to the smaller value after a sufficient number of sync commands have been received by the tape drive.

9. The tape drive as recited in claim 8, wherein the sufficient number of sync commands is three.

10. A computer program product for dynamically changing a buffer threshold in a tape drive, the computer program product comprising a non-transitory computer readable storage medium having program code embodied therewith, the program code readable/executable by a processor to:

collect tape drive writing information while receiving data from a host, the tape drive writing information comprising:

a transaction size (S) indicating an amount of data received by the tape drive and stored in a drive buffer between receiving synchronization (sync) commands; and a host transfer rate (H) indicating a speed at which data is received by the tape drive;

determine that the drive buffer is emptied of data;

calculate a write size (s) indicating an amount of data from the transaction size (S) left to be written to a tape by the tape drive prior to a next anticipated sync command;

set the buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape;

set the buffer threshold (b) to the smaller value when an absolute difference between the transaction size (S) and the write size (s) is greater than or equal to the buffer size (B); and set the buffer threshold (b) to a larger value when the transaction size (S) is not less than the buffer size (B) and/or the absolute difference between the transaction size (S) and the write size (s) is less than the buffer size (B).

11. The computer program product as recited in claim 10, wherein the smaller value is equal to one fourth of the buffer size (B/4).

12. The computer program product as recited in claim 10, wherein the larger value is equal to a difference between the buffer size (B) and an amount of data sent to the tape drive during a back hitch, the amount of data sent to the tape drive during the back hitch being calculated as X*H, where X is an elapsed time for the tape drive to perform a back hitch and H is the host data transfer rate such that the larger value equals B−X*H.

13. The computer program product as recited in claim 10, wherein the program code is further readable/executable by the processor to disregard header label files and/or trailer label files when determining the transaction size (S) between receiving sync commands, wherein the tape drive writing information further comprises:

a tape transfer rate (T) indicating a speed at which data is written to tape by the tape drive;

an elapsed time for the tape drive to perform a back hitch (X); and the buffer size (B).

14. The computer program product as recited in claim 10, wherein the buffer threshold (b) is only set to the smaller value after at least three sync commands have been received by the tape drive.

15. The computer program product as recited in claim 10, wherein the program code is further readable/executable by the processor to receive additional data from the host and store the additional data in the drive buffer using the buffer threshold (b).

16. A method for dynamically changing a buffer threshold in a tape drive, the method comprising:

collecting tape drive writing information while receiving data from a host, the tape drive writing information comprising:

a transaction size (S) indicating an amount of data received by the tape drive and stored in a drive buffer between receiving synchronization (sync) commands; and a host transfer rate (H) indicating a speed at which data is received by the tape drive;

determining that the drive buffer is emptied of data;

calculating a write size (s) indicating an amount of data from the transaction size (S) left to be written to a tape prior to a next anticipated sync command;

setting a buffer threshold (b) to a smaller value when the transaction size (S) is less than a size (B) of the buffer, the buffer threshold (b) indicating an amount of data stored in the drive buffer that triggers a back hitch that precedes writing data from the drive buffer to the tape;

setting the buffer threshold (b) to the smaller value when an absolute difference between the transaction size (S) and the write size (s) is greater than or equal to the buffer size (B); and setting the buffer threshold (b) to a larger value when the transaction size (S) is not less than the buffer size (B) and/or the absolute difference between the transaction size (S) and the write size (s) is less than the buffer size (B).

17. The method as recited in claim 16, wherein the smaller value is equal to one fourth of the buffer size (B/4), and wherein the buffer threshold (b) is only set to the smaller value after at least three sync commands have been received by the tape drive.

18. The method as recited in claim 16, wherein the larger value is equal to a difference between the buffer size (B) and an amount of data sent to the tape drive during a back hitch, the amount of data sent to the tape drive during the back hitch being calculated as X*H, where X is an elapsed time for the tape drive to perform a back hitch and H is the host data transfer rate such that the larger value equals B−X*H.

19. The method as recited in claim 16, further comprising disregarding header label files and/or trailer label files when determining the transaction size (S) between receiving sync commands, wherein the tape drive writing information further comprises:

a tape transfer rate (T) indicating a speed at which data is written to tape by the tape drive;

an elapsed time for the tape drive to perform a back hitch (X); and the buffer size (B).

20. The method as recited in claim 16, further comprising receiving additional data from the host and store the additional data in the drive buffer using the buffer threshold (b).

* * * * *